US011152641B2

(12) United States Patent
Kanno et al.

(10) Patent No.: US 11,152,641 B2
(45) Date of Patent: Oct. 19, 2021

(54) SULFIDE SOLID ELECTROLYTE

(71) Applicant: Tokyo Institute of Technology, Tokyo (JP)

(72) Inventors: Ryoji Kanno, Tokyo (JP); Masaaki Hirayama, Tokyo (JP); Kota Suzuki, Tokyo (JP); Yulong Sun, Tokyo (JP); Satoshi Hori, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 120 days.

(21) Appl. No.: 16/327,804

(22) PCT Filed: Aug. 23, 2017

(86) PCT No.: PCT/JP2017/030149
§ 371 (c)(1),
(2) Date: Feb. 22, 2019

(87) PCT Pub. No.: WO2018/038164
PCT Pub. Date: Mar. 1, 2018

(65) Prior Publication Data
US 2019/0237801 A1 Aug. 1, 2019

(30) Foreign Application Priority Data
Aug. 23, 2016 (JP) .............................. JP2016-163065

(51) Int. Cl.
*H01M 10/0562* (2010.01)
*C01B 33/00* (2006.01)
*C01G 19/00* (2006.01)
*H01M 6/18* (2006.01)
*C04B 35/547* (2006.01)
*H01B 1/06* (2006.01)
*C01D 15/00* (2006.01)
*H01M 10/0525* (2010.01)

(52) U.S. Cl.
CPC ......... *H01M 10/0562* (2013.01); *C01B 33/00* (2013.01); *C01D 15/00* (2013.01);
(Continued)

(58) Field of Classification Search
CPC ........ H01M 10/0562; H01M 6/18; H01B 1/06
See application file for complete search history.

(56) References Cited

U.S. PATENT DOCUMENTS

| 2013/0040208 A1* | 2/2013 | Kanno | ................ C01G 17/006 429/319 |
| 2015/0037687 A1* | 2/2015 | Kanno | ................ C01G 19/006 429/319 |
| 2018/0155198 A1* | 6/2018 | Sato  | ........................ B01J 19/20 |

FOREIGN PATENT DOCUMENTS

| EP | 2997611     | 3/2016 |
| EP | 3312846 A1  | 4/2018 |

(Continued)

OTHER PUBLICATIONS

International Search Report and International Preliminary Report on Patentability in International Application No. PCT/JP2017/030149 dated Oct. 24, 2017.

(Continued)

*Primary Examiner* — Jayne L Mershon
(74) *Attorney, Agent, or Firm* — Foley & Lardner LLP

(57) ABSTRACT

Provided is a sulfide solid electrolyte material which has a composition that does not contain Ge, while having a smaller Li content than conventional sulfide solid electrolyte materials, and which has both lithium ion conductivity and chemical stability at the same time. A sulfide solid electrolyte which has a crystal structure represented by composition formula $(Li_{3.45+\beta-4\alpha}Sn_{\alpha})(Si_{0.36}Sn_{0.09})(P_{0.55-\beta}Si_{\beta})S_4$ (wherein $\alpha \leq 0.67$, $\beta \leq 0.33$ and $0.43 < \alpha + \beta$ (provided that $0.23 < \alpha \leq 0.4$ when $\beta=0.2$ and $0.13 < \alpha \leq 0.4$ when $\beta=0.3$ may be excluded)), or a crystal structure represented by composition formula $Li_{7+\gamma}Si_{\gamma}P_{1-\gamma}S_6$ (wherein $0.1 \leq \gamma < 0.3$).

6 Claims, 8 Drawing Sheets

(52) U.S. Cl.
CPC .......... *C01G 19/006* (2013.01); *C04B 35/547* (2013.01); *H01B 1/06* (2013.01); *H01M 6/18* (2013.01); *C01P 2002/50* (2013.01); *C01P 2002/72* (2013.01); *C01P 2006/40* (2013.01); *H01M 10/0525* (2013.01); *H01M 2300/0068* (2013.01)

(56) References Cited

FOREIGN PATENT DOCUMENTS

| EP | 3429016 A1 | 1/2019 |
|---|---|---|
| JP | 2013-137889 A | 7/2013 |
| JP | 2015-032550 A | 2/2015 |
| WO | WO-2011/118801 A1 | 9/2011 |
| WO | WO 2014/186634 A2 | 11/2014 |

OTHER PUBLICATIONS

Kamaya et al., "A lithium superionic conductor," Nature Materials, Advanced online publication, Jul. 31, 2011, DOI:10.1038/NMAT3066.

Kanno et al., "Lithium Ionic Conductor Thio-LISICON The Li2S—GeS2—P2S5 System," Journal of The Electrochemical Society, 148 (7) A742-A746 (2001).

* cited by examiner

The synthesis process of $(Li_{3.45+\beta-4\alpha}Sn_\alpha)(Si_{0.36}Sn_{0.09})(P_{0.55-\beta}Si_\beta)S_4$

US 11,152,641 B2

SULFIDE SOLID ELECTROLYTE

CROSS-REFERENCE TO RELATED APPLICATIONS

This application is the U.S. National Stage of PCT/JP2017/030149, filed Aug. 23, 2017, which claims priority to JP 2016-163065, filed Aug. 23, 2016.

FIELD

The present invention relates to a sulfide solid electrolyte comprising an Sn—Si solid solution but not comprising Ge and relates particularly to a sulfide solid electrolyte having a crystalline structure in a compositional range previously not confirmed.

BACKGROUND

Recently, along with the rapid spread of, for example, telecommunications and IT related equipment such as computers, video cameras, and mobile phones the development of batteries used as a power source therefor has become increasingly important. Furthermore, the automotive industry, for example, is also developing high output and high capacity batteries for electric or hybrid vehicles. Of the various batteries, lithium batteries are currently drawing attention in view of the high energy density thereof.

Commercially available lithium batteries currently use an electrolyte solution comprising a flammable organic solvent and thus require the installation of a safety device to prevent a rise in temperature during a short circuit or an improvement in terms of structure and materials to prevent short circuits. In view of this, it is considered that a lithium battery which is made to be an all-solid battery comprising an all-solid electrolyte layer in place of an electrolyte solution is excellent in terms of production costs and productivity since a flammable organic solvent is not used in the battery, whereby any safety devices can be simplified.

Sulfide solid electrolyte materials are known as solid electrolyte materials that can be used in all-solid lithium batteries. For example, non-Patent Literature 1 discloses an Li ion conductor having a composition of $Li_{(4-x)}Ge_{(1-x)}P_xS_4$ (a sulfide solid electrolyte material). Further, Patent Literature 1 discloses an LiGePS-based sulfide solid electrolyte material having a high proportion of a crystal phase that has specific peaks in X-ray diffraction. Furthermore, non-Patent Literature 2 also discloses an LiGePS-based sulfide solid electrolyte material.

CITATION LIST

Patent Literature

[PTL 1] WO2011/118801

Non Patent Literature

[NPL 1] Ryoji Kanno et al., "Lithium Ionic Conductor Thio-LISICON The Li2S-GeS2-P2S5 System", Journal of The Electrochemical Society, 148 (7) A742-A746 (2001)
[NPL 1] Noriaki Kamaya et al., "A lithium superionic conductor", Nature Materials, Advanced online publication, 31 Jul. 2011, DOI: 10.1038/NMAT3066

SUMMARY

Technical Problem

From the viewpoint of increasing the output of a battery, a solid electrolyte material with good ion conductivity is required.

Non Patent Literature 2 reports that $Li_{10}GeP_2S_{12}$ (may hereinafter be referred to as "LGPS-based sulfide solid electrolyte", "LGPS" or the like) exhibits a high ionic conductivity comparable to an electrolyte solution of $12\times10^{-3}$ S cm$^{-1}$.

Non Patent Literature 1 and Patent Literature 1 examine the composition of $Li_{(4-x)}Ge_{(1-x)}P_xS_4$. These sulfide solid electrolyte materials are solid solution systems of $Li_4GeS_4$ and $Li_3PS_4$ and have a composition in which the Li content is relatively high. High output and high energy density potential of Li is attributed to the high activity thereof. In view of safety, it is desirable that a solid electrolyte with a low Li content can be selected.

Furthermore, the aforementioned documents each disclose a sulfide solid electrolyte material comprising Ge. However, the cost of Ge is high, and it has been shown that Ge has low chemical stability such as resistance to reduction. The LGPS-based sulfide solid electrode material disclosed in Patent Literature 1 has the problem that, as the reduction potential for Ge is approximately 0.25 V (vs Li/Li$^+$), the use thereof in a battery with a negative electrode active material having an operating potential lower than 0.25 V results in the sulfide solid electrolyte material undergoing reductive degradation and deteriorating.

In view of addressing the aforementioned problem, the object of the present invention is to provide a sulfide solid electrolyte material having both excellent electrochemical stability as well as high lithium conductivity without including Ge.

Solution to Problem

In order to solve the aforementioned problem, the present inventors, through extensive research, conceived of using an LGPS-based sulfide solid electrolyte material as a base and substituting Ge with Sn and Si while reducing the Li content. As a result thereof, it was discovered that a solid electroconductive material having a crystalline structure represented by the compositional formula $(Li_{3.45+\beta-4\alpha}Sn_\alpha)(Si_{0.36}Sn_{0.09})(P_{0.55-\beta}Si_\beta)S_4$ could be obtained in a ternary solid solution region $(Li_2S)_x$-$(MS_2)_y$-$(P_2S_5)_z$ (see FIG. 1). Furthermore, the present inventors discovered a sulfide solid electrolyte having a crystalline structure represented by the compositional formula $Li_{7+\gamma}Si_\gamma P_{1-\gamma}S_6$, where $0.1\leq\gamma<0.3$, using a conventionally known argyrodite-type $Li_7PS_6$ as a base in which the P content can be reduced by substituting P with Si. The inventors completed the invention based on these findings.

The following means is provided according to the present invention.

[1] A sulfide solid electrolyte having a crystalline structure represented by the compositional formula $(Li_{3.45+\beta-4\alpha}Sn_\alpha)(Si_{0.36}Sn_{0.09})(P_{0.55-\beta}Si_\beta)S_4$, where $\alpha\leq0.67$, $\beta\leq0.33$, and $0.43<\alpha+\beta$ (with the provision that $0.23<\alpha\leq0.4$ when $\beta=0.2$, and $0.13<\alpha\leq0.4$ when $\beta=0.3$ may be excluded), or the compositional formula $Li_{7+\gamma}Si_\gamma P_{1-\gamma}S_6$, where $0.1\leq\gamma<0.3$.

[2] The sulfide solid electrolyte according to [1] having characteristic peaks in the vicinity of at least diffraction angles (2θ) 15.9°, 18.3°, 25.9°, 30.4°, 31.8°, 40.3° 41.3°, 45.5° and 48.4° in powder X-ray diffraction using Cu-Kα radiation with an X-ray wavelength of 1.5418 angstrom.

[3] The sulfide solid electrolyte according to [1] or [2] wherein $0.2 \leq \beta$.

Advantageous Effects of Invention

The present invention provides a sulfide solid electrolyte comprising an Sn—Si solid solution but not comprising Ge, in which the sulfide solid electrolyte has lower Li and P contents than in the prior art and has a crystalline structure in a composition range not previously confirmed. The crystalline structure provides a sulfide solid electrolyte material with good Li ion conductivity and/or excellent electrochemical stability. Further, if the crystalline structure is an argyrodite type structure, the stability at room temperature is improved. Furthermore, due to Si enrichment, the sulfide solid electrolyte material can have a low reduction potential.

DESCRIPTION OF EMBODIMENTS

Figure 1:
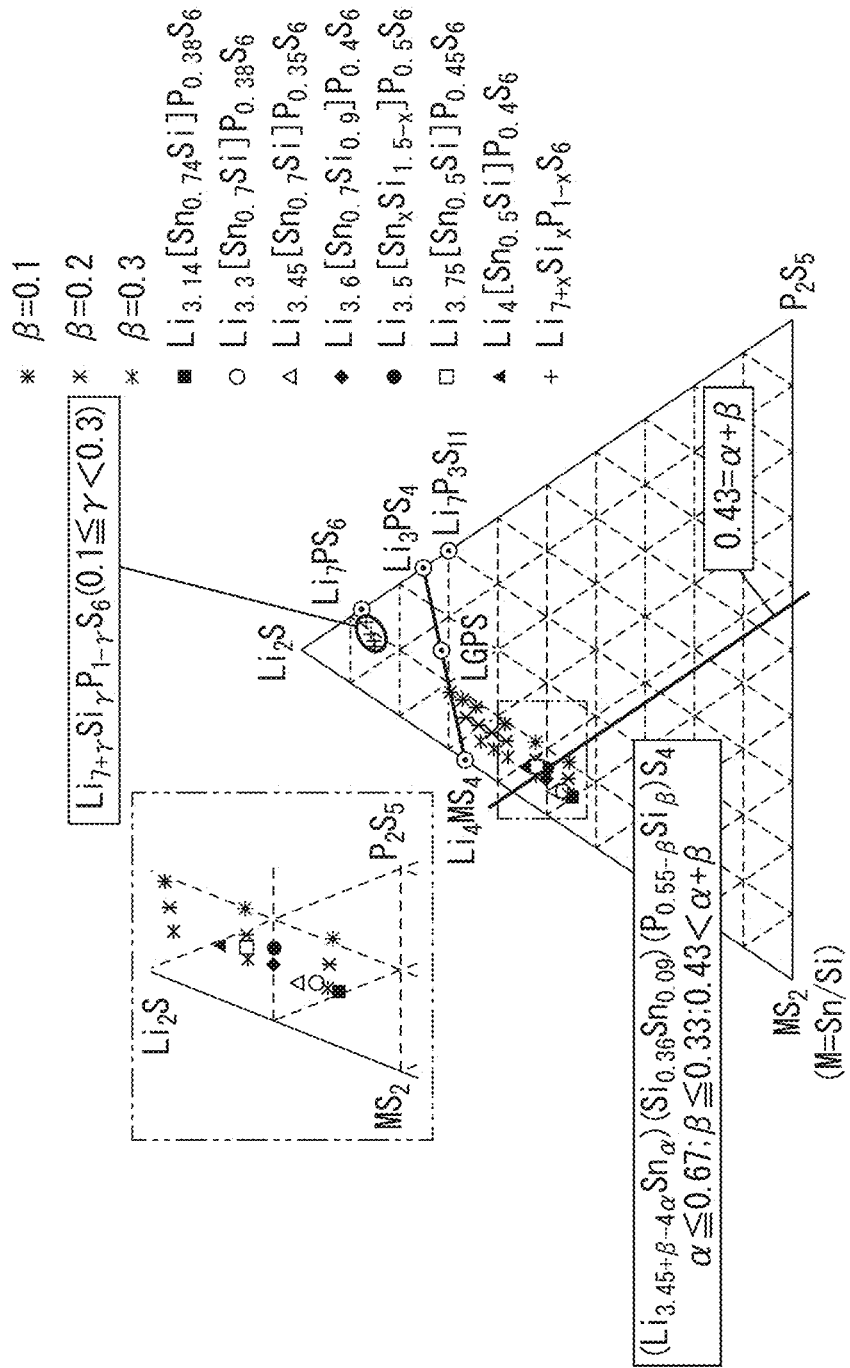
FIG. 1 is a ternary phase diagram of the $Li_2S$-$MS_2$-$P_2S_5$ system (M=Sn, Si) representing the compositional range of the sulfide solid electrolyte of the present invention.

The sulfide solid electrolyte material of the present invention will be described in detail below. However, the present invention is not limited by the following embodiments.

The present inventors, through extensive research, conceived of using an LGPS-based sulfide solid electrolyte material as a base and substituting Ge with Sn and Si while reducing the Li content, and found a sulfide solid electrolyte having a crystalline structure indicated by the compositional formula $(Li_{3.45+\beta-4\alpha}Sn_\alpha)(Si_{0.36}Sn_{0.09})(P_{0.55-\beta}Si_\beta)S_4$ where $a \leq 0.67$, $\beta \leq 0.33$, and $0.43 < \alpha + \beta$ (with the provision that $0.23 < \alpha \leq 0.4$ when $\beta = 0.2$, and $0.13 < \alpha \leq 0.4$ when $\beta = 0.3$ may be excluded). Furthermore, the present inventors found a sulfite solid electrolyte having a crystalline structure represented by the compositional formula $Li_{7+\gamma}Si_\gamma P_{1-\gamma}S_6$ where $0.1 \leq \gamma < 0.3$ using a conventionally known argyrodite-type $Li_7PS_6$ as a base in which the P content can be reduced by substituting P with Si. The inventors conceived of the invention based on these findings.

The sulfide solid electrolyte of the present invention will be described with reference to the $(Li_2S)_x$-$(MS_2)_y$—$(P_2S_{55})_z$ ternary phase diagram of FIG. 1. M represents Si and Sn. The material used as the base for the sulfide solid electrolyte material of the present invention is a highly ion conductive material of the LGPS type phase having the composition $Li_{3.45}[Sn_{0.09}Si_{0.36}]P_{0.55}S_4$ that was previously discovered by the present inventors. In the LGPS structure, the Li (4d) atoms do not contribute to Li ion conduction and play a role in forming the three-dimensional structural framework, and it is considered that Li (4d) is substituted with Sn and P is substituted with Si. Accordingly, the compositional formula for the sulfide solid electrolyte material of the present invention is represented by $(Li_{3.45+\beta-4\alpha}Sn_\alpha)(Si_{0.36}Sn_{0.09})(P_{0.55-\beta}Si_\beta)S_4$. α relates to the composition ratio of Sn, and β to the composition ratio of Si. The addition of Sn and Si changes the composition ratios of Li and P, respectively. The present inventors discovered that a crystalline sulfide solid electrolyte could be obtained in a range wherein $\alpha \leq 0.67$, $\beta \leq 0.33$, and $0.43 < \alpha + \beta$ (with the provision that $0.23 < \alpha \leq 0.4$ when $\beta = 0.2$, and $0.13 < \alpha \leq 0.4$ when $\beta = 0.3$ may be excluded). Until now, it has not been confirmed that a crystalline material can be obtained in a low Li content system comprising an Sn—Si solid solution but not comprising Ge. It is expected that by maintaining the crystalline structure, ion conductivity achieved by the diffusion of ions within the crystalline structure can also be maintained. The existence of crystallinity can easily be confirmed by observing peaks measured by X-ray diffraction and the like.

Figure 2:
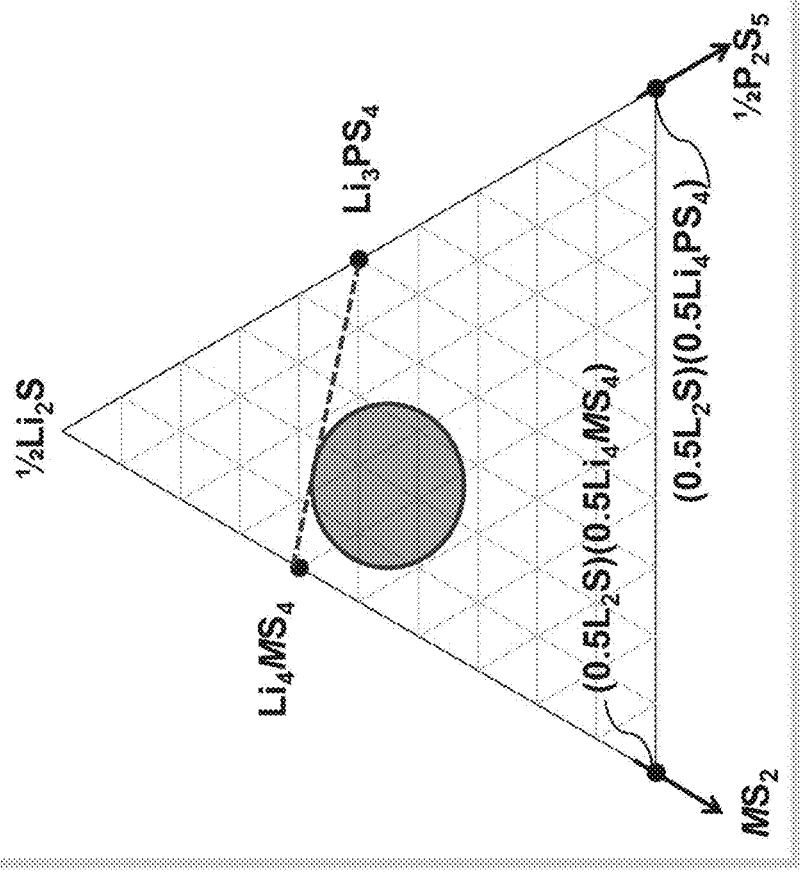
FIG. 2 is a three-dimensional ternary phase diagram schematically representing the state of changes in composition ratios α and β of M (namely Sn and Si) of the sulfide solid electrolyte material of the present invention.
Figure 2:
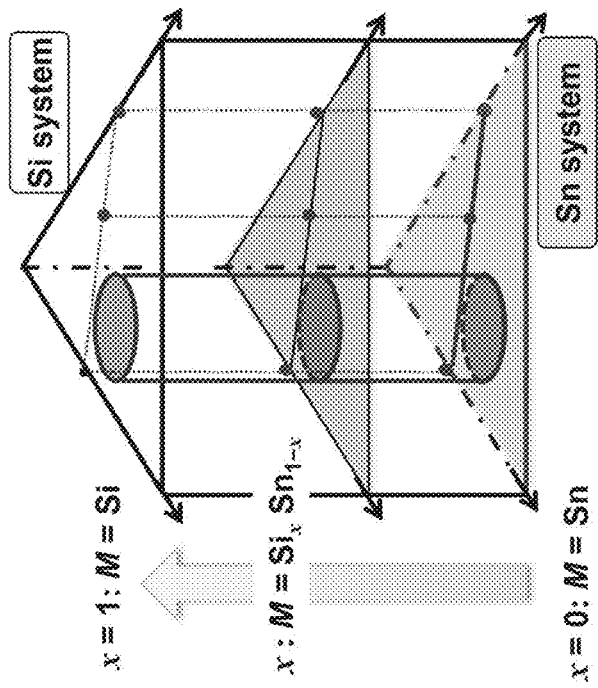

Note that FIG. 1 shows a planar representation of the ternary phase of $(Li_2S)_x$-$(MS_2)_y$—$(P_2S_5)_z$ and FIG. 2 schematically illustrates in three-dimensions the state of changes in composition ratios α and β of M (namely Sn and Si) of the sulfide solid electrolyte material. It should also be noted that FIG. 2 is a reference diagram for understanding the compositional range of the present application and does not accurately represent the composition of the sulfide solid electrolyte material of the invention according to the present application.

A solid electrolyte exhibiting an argyrodite-type phase peak was confirmed in the aforementioned compositional range. The argyrodite-type phase is a phase seen in the highly ion conductive $Li_7PS_6$ known in the prior art. The compositional range of the solid electrolyte of the present application significantly deviates from $Li_7PS_6$ in the ternary phase diagram (FIG. 1) and it is surprising that a crystalline material within the compositional range of the solid electrolyte of the present application was confirmed. Further, by a large proportion of the solid electrolyte comprising an argyrodite type phase in the compositional range of the present application, it is expected that high ion conductivity can be obtained. Note that there are cases when the solid electrolyte material in the aforementioned compositional range is not an argyrodite type phase solid electrolyte material but is an LGPS type phase solid electrolyte material. This is thought to be because the solid electrolyte material in the aforementioned compositional range uses an LGPS type phase material having a composition of $Li_{3.45}[Sn_{0.09}Si_{0.36}]P_{0.55}S_4$, which has high ion conductivity, as the base material. It is expected that even if the solid electrolyte with the compositional range of the present application comprises a high proportion of an LGPS type phase, high ion conductivity can be obtained.

Figure 3:
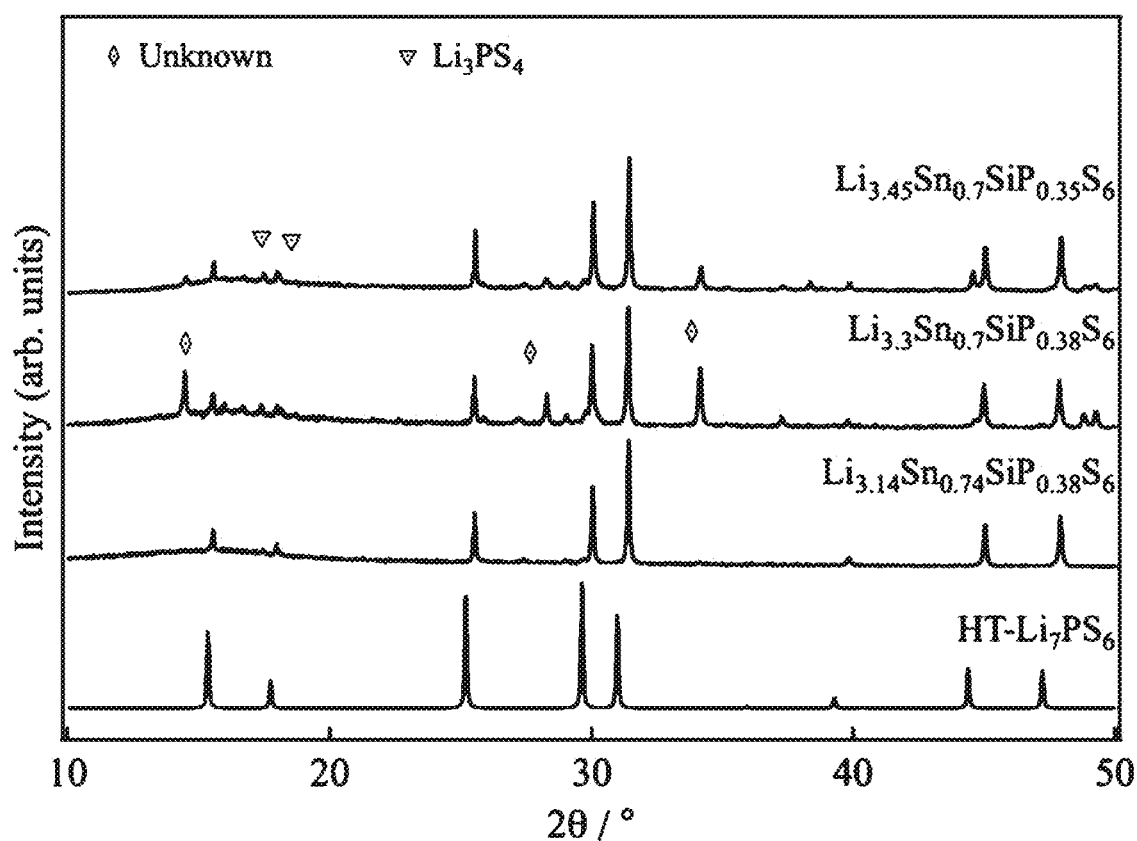
FIG. 3 is an X-ray diffraction pattern of the solid electrolyte (Examples and Reference Example) represented by the compositional formula $(Li_{3.45+\beta-4\alpha}Sn_\alpha)(Si_{0.36}Sn_{0.09})(P_{0.55-\beta}Si_\beta)S_4$ comprising a crystalline phase of the present invention.

Argyrodite type phases exhibit characteristic peaks when measured by X-ray diffraction. FIG. 3 illustrates X-ray diffraction spectra for comparing the sulfide solid electrolyte material of the present invention and an argyrodite type sulfide solid electrolyte material (HT [High Temperature]—$Li_7PS_6$) of the prior art. Both exhibit similar peaks and the sulfide solid electrolyte material of the present invention comprises a high proportion of an argyrodite-type phase.

More specifically, at least a portion of the sulfide solid electrolyte material of the present application has characteristic peaks in the vicinity of at least diffraction angles (2θ) 15.9°, 18.3°, 25.9°, 30.4°, 31.8°, 40.3°, 41.3°, 45.5° and 48.4° in powder X-ray diffraction using Cu-Kα radiation with an X-ray wavelength of 1.5418 angstrom. Note that the peaks may be within ±0.50° (preferably ±0.30°) of the aforementioned positions. In view of the characteristic diffraction angle (2θ) peaks, at least a portion of the sulfide solid electrolyte material of the present invention comprises a high proportion of an argyrodite type phase.

Figure 4:
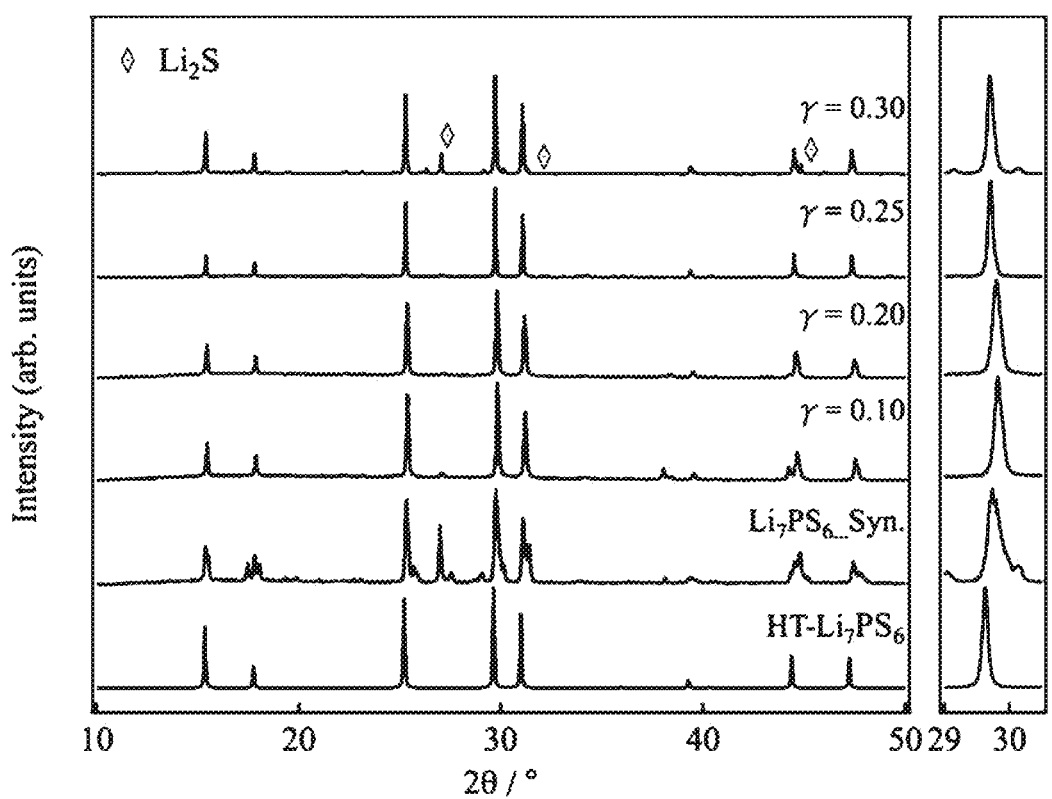
FIG. 4 is an X-ray diffraction pattern of a solid electrolyte (Examples and Reference Example) represented by the compositional formula $Li_{7+\gamma}Si_\gamma P_{1-\gamma}S_6$ comprising a crystalline phase of the present invention.

In general, many cubic argyrodite phases, such as $Ag_8SiS_6$, $Cu_8GeS_6$, and HT-$Li_7PS_6$, transform to orthorhombic crystals at room temperature, accompanied by a significant decrease in ionic conductivity. However, due to the introduction of $Sn^{4+}$ and $Si^{4+}$, a cubic crystal argyrodite phase can be synthesized by a conventional solid solution reaction. Thus, it is considered that by introducing $Sn^{4+}$ and $Si^{4+}$ to an Li—P—S argyrodite phase, phase transition can be inhibited. Based on this idea, the present inventors discovered a sulfide solid electrolyte having a crystalline structure represented by the compositional formula $Li_{7+\gamma}Si_\gamma P_{1-\gamma}S_6$, where 0.1≤γ<0.3, using a conventionally known argyrodite-type $Li_7PS_6$ as a base in which the P content can be reduced by substituting P with Si. FIG. 4 shows that the results of XRD measurements on $Li_{7+\gamma}Si_\gamma P_{1-\gamma}S_6$. $Li_7PS_6$ not substituted with Si was obtained as an orthorhombic low temperature phase. With 0.1≤γ<0.3 the XRD peak gradually shifts to the low angle direction as γ increases but the argyrodite type phase is maintained. This peak shift suggests that P is gradually substituted by Si. The incorporation of Si, which has a larger ionic radius than P, is thought to contribute to the expansion of the lattice parameter of the argyrodite phase. However, if γ increases to 0.3, a peak shift in the argyrodite phase cannot be seen and there is a relative increase in the $Li_2S$ peak. This suggests that Si is no longer replacing P. As a result thereof, it is confirmed that the introduction of $Si^{4+}$ allows the synthesis of a cubic argyrodite type $Li_7PS_6$ by a conventional solid solution reaction, the compositional formula of which is $Li_{7+\gamma}Si_\gamma P_{1-\gamma}S_6$ where 0.1≤γ<0.3.

Note that there are cases when the solid electrolyte material within the aforementioned compositional range has a crystalline structure other than an argyrodite type phase, for example, an LGPS type phase. Even in cases when a solid electrolyte within the compositional range of the present application includes a high proportion of an LGPS type phase, it is expected that high ion conductivity can be obtained.

Figure 5:
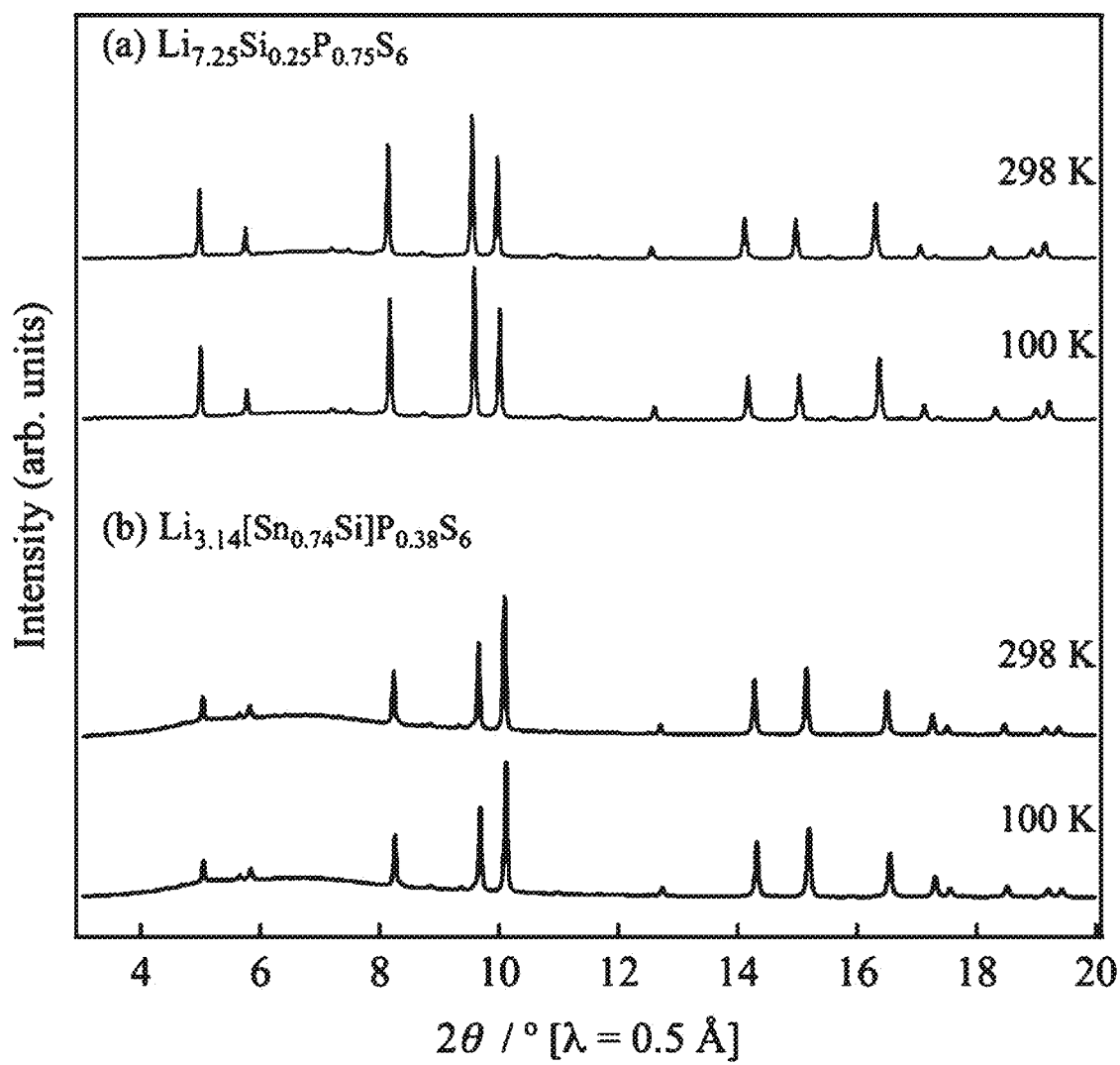
FIG. 5 is an X-ray diffraction pattern of $Li_{3.45}[Sn_{0.74}Si]P_{0.38}S_6$ and $Li_{7.25}Si_{0.25}P_{0.75}S_6$.

FIG. 5 shows the results of performing XRD measurements at 100 K and 298 K on $Li_{7.25}Si_{0.25}P_{0.75}S_6$ and $Li_{3.14}[Sn_{0.74}Si]P_{0.38}S_6$, which are solid electrolyte materials within the compositional range of the present application and which are obtained by introducing $Si^{4+}$ to HT-$Li_7PS_6$ of the prior art. A peak shift along with an increase in angle due to lattice contraction is confirmed in both materials. This suggests that there is no phase transition in the aforementioned temperature range. The argyrodite type phase seen in the HT-$Li_7PS_6$ known in the prior art has been confirmed at 210° C. or more but the argyrodite type crystalline structure seen in the sulfide solid electrolyte material of the present application was confirmed at room temperature (298 K). In other words, according to an argyrodite type phase as seen in the present invention, stability at room temperature and furthermore, stability at 100 K, can be obtained.

Figure 6:
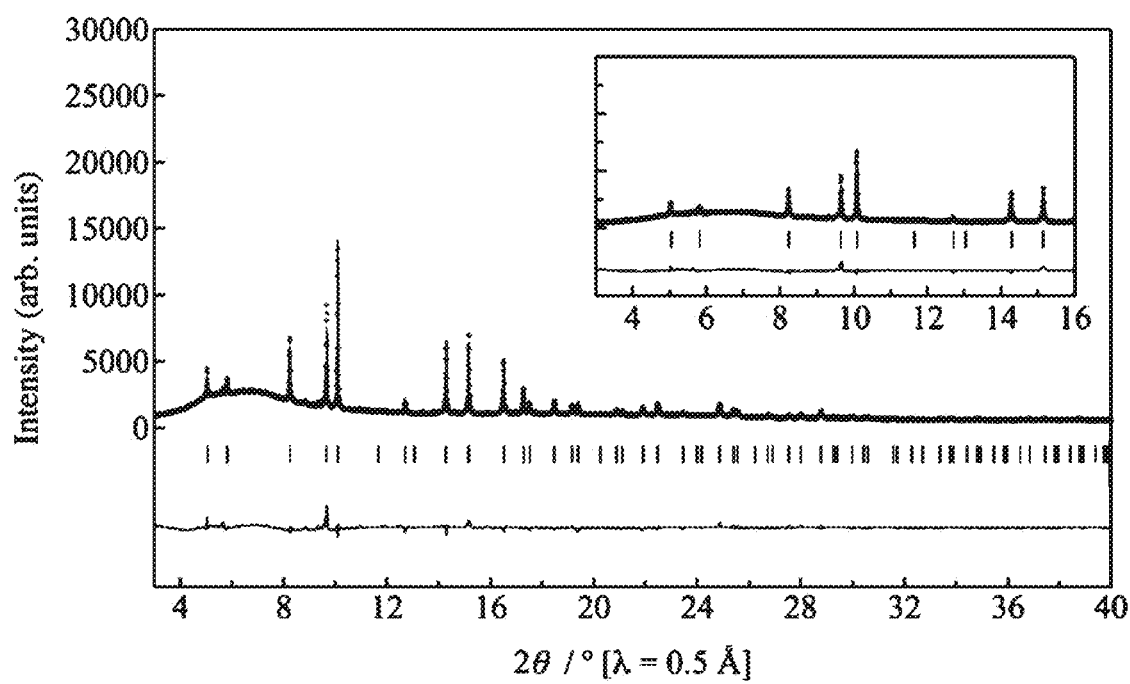
FIG. 6 illustrates the results of structural analysis of $Li_{3.45}[Sn_{0.74}Si]P_{0.38}S_6$.
Figure 7:
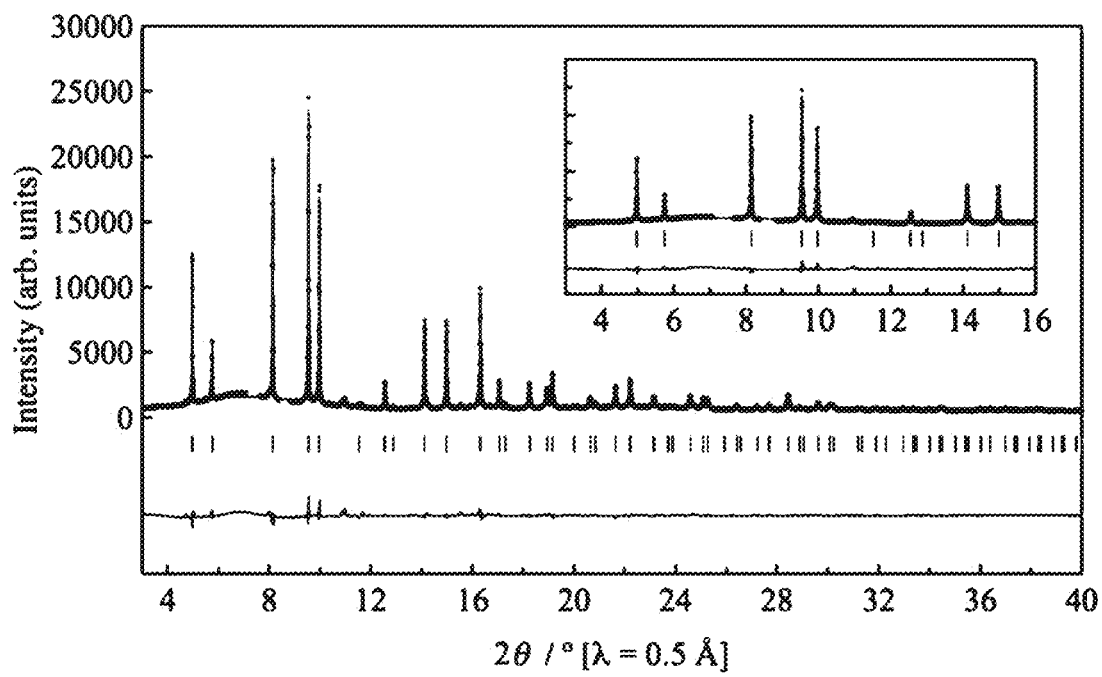
FIG. 7 illustrates the results of structural analysis of $Li_{7.25}Si_{0.25}P_{0.75}S_6$.

FIGS. 6 and 7 show examples of synchrotron X-ray Rietveld analysis patterns of the electrolyte materials of the present invention, i.e., $Li_{3.14}[Sn_{0.74}Si]P_{0.38}S_6$ and $LiPS_6$-derived $Li_{7.25}Si_{0.25}P_{0.75}S_6$, respectively. Both materials have a structure equivalent to an HT (High Temperature)—$Li_7PS_6$ phase (space group F-43m, No. 216) and thus the same structural model was used for the initial values of the Rietveld method. Note that the observed data is represented by the symbol (+) and the solid line superimposed thereon is obtained by Rietveld analysis and that the observed data and the analysis results are consistent. The lowermost line in FIGS. 6 and 7 illustrates the difference in intensity of the observed value and calculated value. This difference was extremely small and the fact that the observed data and the analysis results are consistent is supported.

The vertical symbol (|) plotted between the upper and lower lines represents positions of Bragg reflection available in the space group of the crystal phase and further supports the fact that the electrolyte material of the present application has a crystal phase.

Synchrotron X-ray measurement is a measurement method using synchrotron radiation (an electromagnetic wave generated when electrons advancing at a speed close to the speed of light are forced to change direction). Synchrotron radiation has high luminance and thus the crystal structure can be analyzed in more detail.

The sulfide solid electrolyte material of the present application has a crystalline structure. The crystalline structure includes an LGPS type crystalline structure in addition to the argyrodite type crystal structure. It is expected that high ion conductivity can be obtained with solid electrolyte materials having argyrodite type crystal structures and LGPS type crystal structures.

It is preferable for the sulfide solid electrolyte material of the present application to have high ion conductivity and when a powdered sulfide solid electrolyte material is cold compressed, an ion conductivity of $3.9\times10^{-5}$ S/cm or more can be obtained for the sulfide solid electrolyte material at 25° C. The results of measuring the ion conductivity by an AC impedance method of cold compressed powders of $Li_{3.14}[Sn_{0.74}Si]P_{0.38}S_6$ and the $LiPS_6$-derived $Li_{7.25}Si_{0.25}P_{0.75}S_6$, which are the electrolyte materials of the present application, are shown in Table 1.

TABLE 1

| Ion conductivity of cold compressed powder of $Li_{3.14}[Sn_{0.74}Si]P_{0.38}S_6$ and $Li_{7+\gamma}Si_\gamma P_{1-\gamma}S_6$ (0.1 ≤ γ < 0.3) | |
|---|---|
| Composition | Ionic conductivity (S cm$^{-1}$) |
| $Li_{3.14}[Sn_{0.74}Si]P_{0.38}S_6$ | $3.9 \times 10^{-5}$ |
| $Li_{7.1}Si_{0.1}P_{0.9}S_6$ | $4.4 \times 10^{-4}$ |
| $Li_{7.2}Si_{0.2}P_{0.8}S_6$ | $8.5 \times 10^{-4}$ |
| $Li_{7.25}Si_{0.25}P_{0.75}S_6$ | $9.5 \times 10^{-4}$ |
| $Li_{7.3}Si_{0.3}P_{0.7}S_6$ | $7.2 \times 10^{-4}$ |

For the $Li_7PS_6$-derived $Li_{7+\gamma}Si_\gamma P_{1-\gamma}S_6$ series, which are electrolyte materials of the present application, the ionic conductivity increases from $4.4\times10^{-4}$ S cm$^{-1}$ to $9.5\times10^{-4}$ S cm$^{-1}$ with an increase in the Li content and the lattice parameter but then decreases to $7.2\times10^{-4}$ S cm$^{-1}$ due to $Li_2S$ impurities. The ion conductivity of the $Li_{3.14}[Sn_{0.74}Si]P_{0.38}S_6$ electrolyte material of the present application is an order of magnitude lower than $Li_{7+\gamma}Si_\gamma P_{1-\gamma}S_6$ series. The reason therefor is considered to be that at a low Li content the Sn/Si at the 48 h site blocks the diffusion of Li. Note that ionic conductivity can be improved by increasing the density so as to decrease grain boundary resistance, for example, it is possible to improve ion conductivity by making sintered pellets. Furthermore, the form of the sulfide solid electrolyte material of the present application is not particularly limited, and may, for example, be a powdered form. Moreover, it is preferable for the average particle size of the powdered sulfide solid electrolyte material to be in the range of 0.1 μm to 50 μm.

Further, in the compositional formula of the sulfide solid electrolyte material of the present invention ($Li_{3.45+\beta-4\alpha}Sn_\alpha)(Si_{0.36}Sn_{0.09})(P_{0.55-\beta}Si_\beta)S_4$, β may be ≥0.2. That is, by adding a predetermined ratio of Si (such that β≥0.2) a sulfide solid electrolyte material with a low reduction potential may be obtained. It is considered that the property of resistance to reductive degradation is attributed to Si which has a small ionic radius and forms a strong bond with S. It is assumed that, as a result, the reduction potential thereof is reduced. Further, when compared to the alloying potential with Li, Si is close to 0.35 V ($Li/Li^+$) and is lower than Ge which is close to 0.4 V ($Li/Li^+$) and is difficult to form alloys with Li. As a result thereof, it is assumed that the electrolyte material of the present application has a lower reduction potential than electrolyte materials of the type comprising Ge. However, with the sulfide solid electrolyte material of the present invention it is considered that Li is substituted with Sn. Although in general Li is highly active and readily reacts with moisture in the atmosphere, Sn has stable properties with respect to moisture. The sulfide solid electrolyte material of the present invention can incorporate Sn (that is, Li can be replaced thereby) and increase stability with respect to moisture.

The electrochemical stability of the sulfide solid electrolyte material of the present application can be evaluated with cyclic voltammetry. It has been pointed out that Ge contained in LGPS has low reduction resistivity and so it is expected that as the sulfide solid electrolyte material of the present application does not contain Ge, reduction resistivity will increase.

The sulfide solid electrolyte material of the present application can be made to have ion conductivity and thus can be used in applications requiring ion conductivity. Thereamong, the use of the sulfide solid electrolyte material of the present application in batteries is preferable.

This is because of the large contribution made thereby in increasing the output of batteries.

The sulfide solid electrolyte material of the present application has high ion conductivity as stated above. However, although it goes without saying, when considering the actual use thereof in a battery, even if the solid electrolyte material has a confirmed ion conductivity, it is desirable to confirm that charging and discharging can be stably performed and that performance degradation (decrease in charge discharge capacity) is low when incorporated into a battery. Batteries using the sulfide solid electrolyte material of the present application are stably operational and have little reduction in charging capacity even when charge/discharge testing is carried out in models of actual operation. Thus, the sulfide solid electrolyte material of the present application enables the use of metallic Li, which has the greatest theoretical energy density, as a negative electrode of an all-solid battery and greatly contributes to the increase of energy density of all-solid batteries.

The method of producing the sulfide solid electrolyte material of the present application will be described. The method of producing the solid electrolyte material of the present application comprises: a raw material composition preparation step of preparing a raw material composition by weighing the elements Li, Si, Sn, P and S so as to yield a desired composition, grinding and mixing, and shaping; and a heating step of heating the raw material composition to thereby obtain the solid electrolyte material. Sulfides of each element $Li_2S$, $P_2S_5$, $SiS_2$ and $SnS_2$ may be used as the feedstock for each element.

Figure 8:
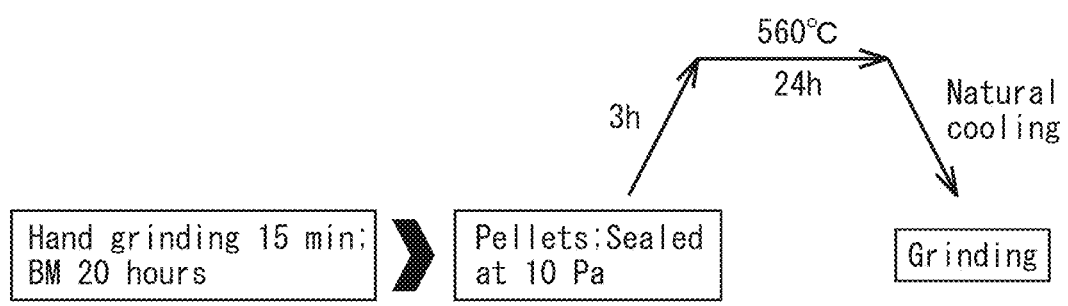
FIG. 8 illustrates an example of the synthesis process of $(Li_{3.45+\beta-4\alpha}Sn_\alpha)(Si_{0.36}Sn_{0.09})(P_{0.55-\beta}Si_\beta)S_4$ and $Li_{7+\gamma}Si_\gamma P_{1-\gamma}S_6$.

FIG. 8 is an explanatory diagram that illustrates an example of a method for producing the solid electrolyte material of the present invention. In the method for producing the solid electrolyte material illustrated in FIG. 8, first, the raw material composition is prepared which involves weighing $Li_2S$, $P_2S_5$, $SiS_2$ and $SnS_2$ to yield a desired composition, coarsely grinding by hand and thereafter grinding and mixing with, for example, a ball mill, then forming pellets thereof. Next, the solid electrolyte material is obtained by a solid phase reaction by heating the raw material composition.

Grinding and mixing may be carried out by mechanical milling. Mechanical milling is a method that applies mechanical energy to a sample while grinding. Examples of such mechanical milling include vibration mills, ball mills, turbo mills, mechanofusion, disk mills, and the like. From thereamong, vibration mills and ball mills are preferable. The conditions for one of the given examples, the vibration mill, are not particularly limited provided the target object can be ground and mixed. The vibration amplitude for the vibration mill is, for example, in the range of 5 mm to 15 mm, and therewithin, the range of 6 mm to 10 mm is preferable. The vibration frequency of the vibration mill is in the range of 500 rpm to 2000 rpm, and therewithin, the range of 1000 rpm to 1800 rpm is preferable. The filling rate of the vibration mill with the sample is, for example, in the range of 1% by volume to 80% by volume, and therewithin, the range of 5% by volume to 60% by volume, particularly 10% by volume to 50% by volume is preferable. Furthermore, it is preferable to use a vibrator (e.g. an alumina vibrator) with the vibration mill.

The conditions for a ball mill are not particularly limited provided the target object can be ground and mixed. In general, the higher the rotation speed the quicker the formation speed of the ion conductive material, and the longer the processing time the higher the conversion rate from raw material composition to the ion conductive material. The rotational speed of a base plate when using a planetary ball mill is, for example, in the range of 200 rpm to 500 rpm, and therewithin the range of 250 rpm to 400 rpm is preferable. Further, the processing time when using a planetary ball mill is, for example, in the range of 1 to 100 hours, and therewithin the range of 1 to 70 hours is preferable.

The heating temperature of the heating step can be appropriately adjusted according to the starting material but is preferably in the range of 500° C. to 900° C. Further, the heating time includes the time during which the temperature increases and the time during which the temperature is maintained and it is preferable for the duration of each to be adjusted so that a desired solid electrolyte material is obtained. For example, the duration can be set to within a range of 30 minutes to 48 hours. Heating can be performed in a partial vacuum. The partial vacuum may be 0.01 to 100

Pa. Furthermore, after heating, when cooling to room temperature, natural cooling may be employed or annealing may be performed to obtain the desired solid electrolyte material.

This sequence of steps is preferably carried out in an inert gas atmosphere such as argon to prevent the raw material composition and obtained solid electrolyte material from degrading due to moisture in the air.

EXAMPLES

The present invention will be explained in further detail with reference to the embodiments below. Note that the following embodiments do not limit the present invention.
(Preparation of Sample)

In order to obtain the desired composition, starting materials $Li_2S$, $P_2S_5$, $SiS_2$, and $SnS_2$ were weighed and crushed by hand, and a ball mill was used to prepare a mixed sample. This mixed sample was introduced into a pellet press and 20 MPa of pressure was applied to the pellet press using a uniaxial pressing machine and φ13 mm pellets were formed. The pellets were enclosed in a carbon coated quartz tube in a 10 Pa partial vacuum. The temperature of the quartz tube into which the pellets were introduced was raised to 560° C. over three hours (rate of temperature increase approximately 3° C./minute), this temperature was maintained for 24 hours, and thereafter naturally cooled. Thereafter, the pellets were ground for evaluation. The composition of the synthesized sample is illustrated in the ternary diagram of FIG. 1.

The following measurements and evaluation were carried out on the obtained sample.
(Powder X-Ray Diffraction Measurements)

In order to identify crystals included in the prepared sample, powder X-ray diffraction measurements were carried out using a powder X-ray diffraction apparatus Ulima-IV (manufactured by Rigaku) and Smart Lab (manufactured by Rigaku). Cu-Kα radiation with an X-ray wavelength of 1.5418 angstrom was used. Powder X-ray diffraction measurements for the diffraction angle (2θ) were carried out in steps of 0.01° over a range of 10 to 50°.
(Conductivity Measurements)

A ground sample was introduced into a cell for room temperature use and thereafter 5 MPa pressure was applied to the cell for room temperature use to prepare a pellet. A metallic powder was dispersed in both surfaces of the pellet, thereafter 15 MPa of pressure was applied to the pellet forming electrodes on both surfaces of the pellet thereby preparing a sample for measurement. An impedance gain phase analyzer Solatron 1260 (Solatron) was used for measuring the conductivity of the sample for measurement. AC impedance measurements were carried out under conditions in which the measurement range was 1 Hz to 10 MHz, the measurement temperature was 25° C., the AC voltage was 50 to 100 mV, and the integration time was 2 seconds, and the conductivity of the sample was measured. Furthermore, as a comparative example, the conductivity of a solid electrolyte different from the solid electrolyte of the present application was also examined.
(Constant Current Charge/Discharge Test)

In the charge/discharge test, all-solid lithium batteries were constructed with an $LiNbO_2$-coated $LiCoO_2$ as the positive electrode active material, an Li—In alloy as the negative electrode active material, and the sulfide solid electrolyte material obtained in the Examples interposed therebetween as the lithium ion conductive solid electrolyte. Charge/discharge tests were performed on these batteries at 1/20 C (=7.25 mA/g).

[Evaluation]
(X-Ray Diffraction Measurement)

X-ray diffraction (XRD) measurements were carried out using the sulfide solid electrolyte material obtained as previously described. The results are shown in FIG. 3. The three uppermost lines in FIG. 3 represent XRD of sulfide solid electrolyte materials in the compositional range of the invention as in the present application measured by Cu-Kα radiation. More specifically, the sulfide solid electrolyte materials had compositions around $Li_{3.225}[Sn_{0.735}Si_{0.99}]P_{0.375}S_6$ (α=0.4, β=0.3). The bottom line in FIG. 3 represents an XRD pattern of HT-$Li_7PS_6$ measured with Cu-Kα radiation as a control. In order to compare the typical Li argyrodite $Li_7PS_6$ and $LiPS_{5X}$, the S in each compositional formula is set to 6. In $Li_{3.14}[Sn_{0.74}Si]P_{0.38}S_6$, characteristic diffraction peaks for a cubic argyrodite phase were observed substantially without an accompanying impurity peak. Other compositions $Li_{3.3}[Sn_{0.7}Si]P_{0.38}S_6$ and $Li_{3.45}[Sn_{0.7}Si]P_{0.35}S_6$ were synthesized with reduced Sn and P content and increased Li content. However, the intensities of the diffraction peaks of an unknown phase and $Li_3PS_4$ increased.

Further, FIG. 4 illustrates the results of XRD measurements of $Li_{7+\gamma}Si_\gamma P_{1-\gamma}S_6$. The $Li_{7+\gamma}Si_\gamma P_{1-\gamma}S_6$ was a sulfide solid electrolyte obtained by using a conventionally known argyrodite type $Li_7PS_6$ as a base and substituting P with Si. The compositional range of the invention of the present application was $0.1 \leq \gamma < 0.3$. $Li_7PS_6$ not substituted with Si was obtained as an orthorhombic low temperature phase. For $0.1 \leq \gamma < 0.3$ the XRD peak gently shifted to the low angle direction as γ increased but the argyrodite phase was maintained. This peak shift suggested that Si was gradually replacing P. The incorporation of Si, which has a larger ion diameter than P, was considered to contribute to the enlargement of the lattice parameter of the argyrodite phase. When γ was increased to 0.3, a peak shift of the argyrodite phase was not observed but there was a relative increase in the $Li_2S$ peak. This suggested that there was no further substitution of P with Si. The results showed that a cubic crystalline argyrodite type $Li_7PS_6$ could be synthesized by the introduction of $Si^{4+}$ and a conventional solid solution reaction. The compositional formula $Li_{7+\gamma}Si_\gamma P_{1-\gamma}S_6$ thereof, where $0.1 \leq \gamma < 0.3$, was confirmed.

As shown in FIGS. 3 and 4, a substantially single phase sulfide solid electrolyte material could be obtained with $Li_{3.14}[Sn_{0.74}Si]P_{0.38}S_6$ and $Li_{7.25}Si_{0.25}P_{0.75}S_6$. The diffraction pattern for this phase was similar to the high temperature phase of the $Li_7PS_6$ control and suggested an argyrodite structure. The positions of the peaks were 2θ=15.9°, 18.3°, 25.9°, 30.4°, 31.8°, 40.3°, 41.3°, 45.5°, and 48.4°. It is considered that these peaks represent the high lithium ion conductive argyrodite phase. Note that the peaks may be within ±0.50° (preferably ±0.30°) of the aforementioned positions.

FIG. 5 shows the XRD measurement results of $Li_{7.25}Si_{0.25}P_{0.75}S_6$ obtained by introducing $Si^{4+}$ to HT-$Li_7PS_6$ of the prior art and $Li_{3.14}[Sn_{0.74}Si]P_{0.38}S_6$, which are solid electrolyte materials within the compositional range of the present application, at 100 K and 298 K. A peak shift along with an increase in angle due to lattice contraction was confirmed in both materials. This suggested that there was no phase transition in the aforementioned temperature range. The argyrodite type crystal structure seen in the sulfide solid electrolyte material of the present invention was confirmed at room temperature (298 K). That is, the argyrodite type phase seen in the present invention was stable at room temperature and in addition, stability at 100 K can be attained.

FIGS. 6 and 7 illustrate examples of synchrotron X-ray Rietveld analysis patterns of $Li_{3.14}[Sn_{0.74}Si]P_{0.38}S_6$ and the $Li_7PS_6$-derived $Li_{7.25}Si_{0.25}P_{0.75}S_6$ which are electrolyte materials of the present application. Both materials have structures equivalent to the HT (High Temperature)—$Li_7PS_6$ phase (space group F-43m, No. 216) and thus the same structural model was used for the initial values of the Rietveld method. Note that the observed data, which is represented by the symbol (+), and data obtained by Rietveld analysis, which is the solid line overlaid on this data, are consistent. The lowermost line in FIGS. 6 and 7 represent the difference in intensity between the observed value and the calculated value. This difference is extremely small and supports the fact that the observed data and analysis results and consistent.

The vertical line symbol (|) plotted between the upper and lower lines represents positions of Bragg reflection available in the space group of the crystal phase and further supports the fact that the electrolyte material of the present application has a crystal phase.

(Measurement of Li Ion Conductivity)

Table 1 shows the results of measuring, by the AC impedance method, ion conductivity of cold compressed powders of $Li_{3.14}[Sn_{0.74}Si]P_{0.38}S_6$ and the $Li_7PS_6$-derived $Li_{7.25}Si_{0.25}P_{0.75}S_6$, which are the electrolyte materials of the present application.

In the $Li_7PS_6$-derived $Li_{7+\gamma}Si_\gamma P_{1-\gamma}S_6$ series, the conductivity increased from $4.4\times10^{-4}$ to $9.5\times10^{-4}$ S cm$^{-1}$ with an increase in the Li content and the lattice parameter accompanying an increase in the Si ratio but then decreased to $7.2\times10^{-4}$ S cm$^{-1}$ due to $Li_2S$ impurities. The ion conductivity of $Li_{3.14}[Sn_{0.74}Si]P_{0.38}S_6$ was an order of magnitude lower than that of the $Li_{7+\gamma}Si_\gamma P_{1-\gamma}S_6$ series. It is considered that the reason therefor is that the Li content is low and the Sn/Si of the 48 h site blocks the dispersion of Li.

(Constant Current Charge/Discharge Test)

Figure 9:
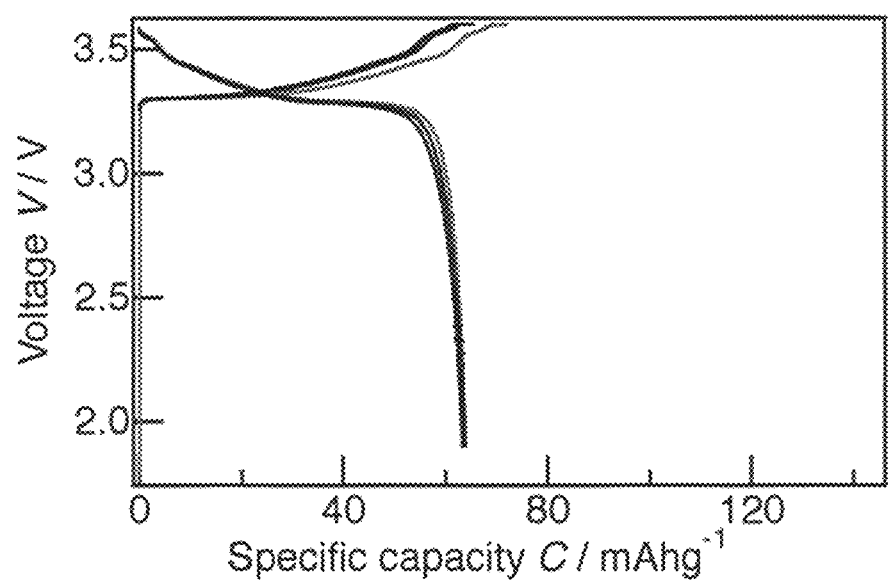
FIG. 9 illustrates the results of a constant current charge/discharge test of a battery using the sulfide solid electrolyte material of the present invention.

For the charge/discharge test, an all-solid lithium battery was produced using the sulfide solid electrolyte material obtained in the Examples as the lithium ion conductive solid electrolyte. The results of charging/discharging the battery are illustrated in FIG. 9. It was confirmed that the lithium battery using the electrolyte material of the present application could be operated without any problems. That is, the electrolyte material of the present application was confirmed to have high electrochemical stability and little degradation of charge/discharge capacity. Thus, the electrolyte material of the present application allows the use of the metal Li, which has the highest theoretical energy density, as the negative electrode in an all-solid battery and thus is expected to make a significant contribution to increasing the energy density of all-solid batteries.

The invention claimed is:

1. A sulfide solid electrolyte having characteristic peaks in at least the vicinity of diffraction angles 2θ: 15.9°, 18.3°, 25.9°, 30.4°, 31.8°, 40.3° 41.3°, 45.5° and 48.4° in powder X-ray diffraction using Cu-K α radiation with an X-ray wavelength of 1.5418 angstrom, wherein the sulfide solid electrolyte has a crystalline structure represented by the compositional formula $(Li_{3.45+\beta-4\alpha}Sn_\alpha)(Si_{0.36}Sn_{0.09})(P_{0.55-\beta}Si_\beta S_4$ where $\alpha\le 0.67$, $\beta\le 0.33$, and $0.43<\alpha+\beta$, with the provision that $0.23<\alpha\le 0.4$ when $\beta=0.2$, and $0.13<\alpha\le 0.4$ when $\beta=0.3$ are excluded.

2. The sulfide solid electrolyte according to claim 1 wherein $0.2\le\beta$.

3. The sulfide solid electrolyte according to claim 1, wherein the sulfide solid electrolyte has characteristic peaks at diffraction angles 2θ: 15.9°±0.50°, 18.3°±0.50°, 25.9°±0.50°, 30.4°±0.50°, 31.8°±0.50°, 40.3°±0.50°, 41.3°±0.50°, 45.5°±0.50° and 48.4°±0.50° in powder X-ray diffraction using Cu-K α radiation with an X-ray wavelength of 1.5418 angstrom.

4. The sulfide solid electrolyte according to claim 1, wherein the sulfide solid electrolyte has characteristic peaks at diffraction angles 2θ: 15.9°±0.30°, 18.3°±0.30°, 25.9°±0.30°, 30.4°±0.30°, 31.8°±0.30°, 40.3°±0.30°, 41.3°±0.30°, 45.5°±0.30° and 48.4°±0.30° in powder X-ray diffraction using Cu-K α radiation with an X-ray wavelength of 1.5418 angstrom.

5. A sulfide solid electrolyte having characteristic peaks at diffraction angles 2θ: 15.9°±0.50°, 18.3°±0.50°, 25.9°±0.50°, 30.4°±0.50°, 31.8°±0.50°, 40.3°±0.50°, 41.3°±0.50°, 45.5°±0.50° and 48.4°±0.50° in powder X-ray diffraction using Cu-K α radiation with an X-ray wavelength of 1.5418 angstrom, wherein the sulfide solid electrolyte has a crystalline structure represented by the compositional formula $(Li_{3.45+\beta-4\alpha}Sn_\alpha)(Si_{0.36}Sn_{0.09})(P_{0.55-\beta}Si_\beta S_4$ where $\alpha\le 0.67$, $\beta\le 0.33$, and $0.43<\alpha+\beta$, with the provision that $0.23<\alpha\le 0.4$ when $\beta=0.2$, and $0.13<\alpha\le 0.4$ when $\beta=0.3$ are excluded.

6. The sulfide solid electrolyte according to claim 5, wherein the sulfide solid electrolyte has characteristic peaks at diffraction angles 2θ: 15.9°±0.30°, 18.3°±0.30°, 25.9°±0.30°, 30.4°±0.30°, 31.8°±0.30°, 40.3°±0.30°, 41.3°±0.30°, 45.5°±0.30° and 48.4°±0.30° in powder X-ray diffraction using Cu-K α radiation with an X-ray wavelength of 1.5418 angstrom.

* * * * *